(12) United States Patent
Hayashi et al.

(10) Patent No.: US 6,649,904 B2
(45) Date of Patent: Nov. 18, 2003

(54) SUBJECT STATE DETECTING APPARATUS FOR DETECTING DYNAMICALLY MOVING SUBJECT

(75) Inventors: Kentaro Hayashi, Tokyo (JP); Manabu Hashimoto, Tokyo (JP); Kazuhiko Sumi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/166,694

(22) Filed: Jun. 12, 2002

(65) Prior Publication Data
US 2003/0116698 A1 Jun. 26, 2003

(30) Foreign Application Priority Data
Dec. 25, 2001 (JP) ...................................... 2001-392405

(51) Int. Cl.⁷ ................................................ H01J 40/14
(52) U.S. Cl. .................. 250/221; 250/559.38; 356/3.01
(58) Field of Search ........................... 250/221, 559.38, 250/559.07, 559.08, 559.22, 201.6; 356/3.01, 3.02, 3.04, 3.06, 623, 138, 614, 622

(56) References Cited

U.S. PATENT DOCUMENTS

| 5,737,083 A | * | 4/1998 | Owechko et al. ............ 356/623 |
| 5,927,752 A | * | 7/1999 | Brandin ....................... 356/3.01 |
| 6,252,240 B1 | * | 6/2001 | Gillis et al. .................. 250/221 |
| 6,441,363 B1 | * | 8/2002 | Cook et al. .................. 250/221 |
| 6,501,536 B1 | * | 12/2002 | Fredricks .................... 356/3.01 |

FOREIGN PATENT DOCUMENTS

| JP | 9-309402 | 12/1997 |
| JP | 2000-241561 | 9/2000 |

* cited by examiner

Primary Examiner—Kevin Pyo
Assistant Examiner—Seung C. Sohn
(74) Attorney, Agent, or Firm—Leydig, Voit & Mayer, LTD

(57) ABSTRACT

A subject-state detecting apparatus has an active distance measuring sensor including projectors for targeting measurement regions independently, and a photodetector for detecting reflection light reflected from a subject that receives light projected by the light projectors. A measurement parameter decision section decides in advance a body parameter to be measured. In response to the parameter, a distance measuring sensor setting section sets a measurement region of the active distance measuring sensor and an additional distance measuring sensor. A state decision section decides state of the subject from the outputs of these sensors.

11 Claims, 13 Drawing Sheets

FIG.2
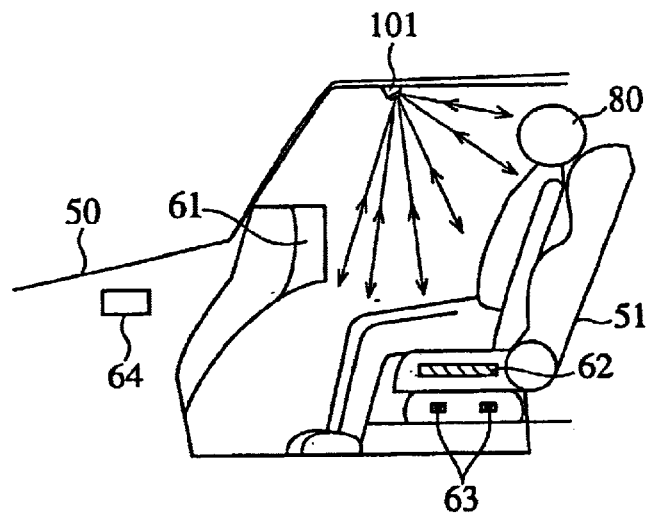
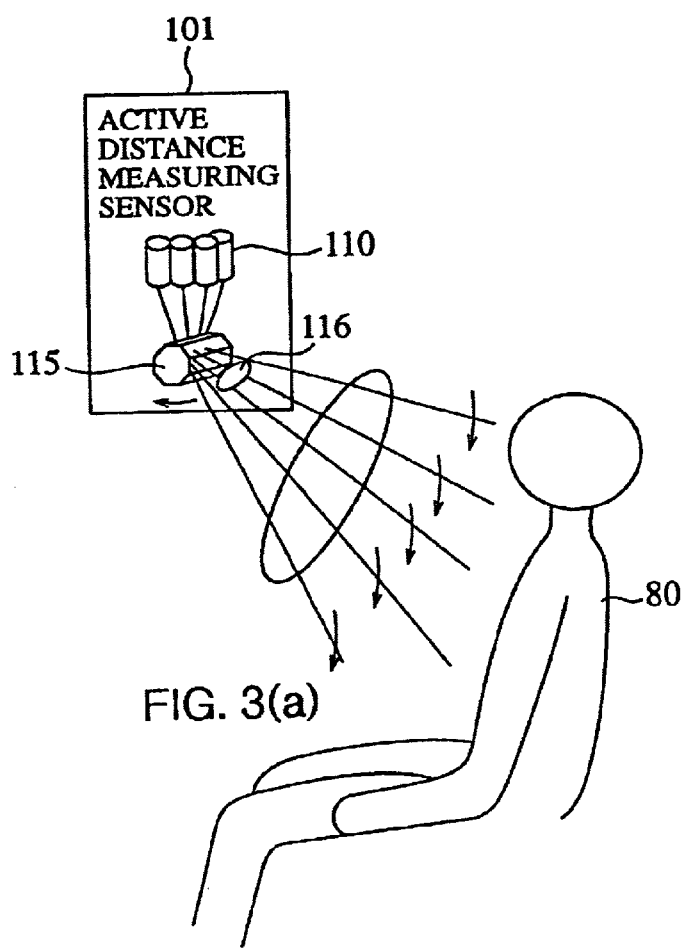
FIG. 3(a)
FIG. 3(b)
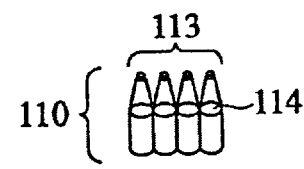
FIG. 3(c)
FIG. 3(d)

POSTURE: $\dfrac{C4-C5}{B2}$

SUBJECT STATE DETECTING APPARATUS FOR DETECTING DYNAMICALLY MOVING SUBJECT

BACKGROUND OF THE INVENTION

1. Field of the Invention

The present invention relates to a subject-state detecting apparatus applicable to a vehicle for detecting the state of an occupant by using an active distance measuring method.

2. Description of Related Art

A subject-state detecting apparatus detects the presence or absence of a person within a measuring range or the frame and posture of a person in a sitting position using an optical sensor or the like. As for such an apparatus, Japanese patent application laid-open No. 9-309402 discloses a technique titled "Occupant Judgement Device for Vehicular Air Bag System", for example. It relates to a configuration of an optical sensor that throws light from a light-emitting device on a subject by a mechanical scanning system, and detects the reflected light with a photodetector via the mechanical scanning system. The optical sensor is mounted on an upper side of a person to throw broad light beams onto the occupant in the vehicle, and decides a rough state of the occupant from the detected light. The occupant decision apparatus can decide whether an adult is sitting in a normal state, or a child is standing.

As another conventional technique of this kind, Japanese patent application laid-open No. 2000-241561 discloses a technique titled "Device and Method for Detecting In-Bed State". It measures the heights of individual points of a subject by projecting light or ultrasound onto the subject from a light source or ultrasound source attached on a ceiling, and by capturing the reflected light or sound by a distance measuring sensor, thereby making it possible to detect the state of a person on a bed.

With the foregoing configurations, the conventional subject-state detecting apparatuses throw broad light beams onto the subjects, and hence can recognize only a rough state of a person. In addition, they have a problem in that they can detect only presupposed static states.

SUMMARY OF THE INVENTION

The present invention is implemented to solve the foregoing problems. It is therefore an object of the present invention to provide a subject-state detecting apparatus capable of detecting the state of a person accurately in such circumstances as the subject changes dynamically.

According to one aspect of the present invention, there is provided a subject-state detecting apparatus comprising: a distance measuring section that has an active distance measuring sensor including a plurality of projectors and a photodetector for detecting reflection light; a measurement parameter decision section for deciding a body parameter to be measured in advance; a distance measuring sensor setting section for setting the active distance measuring sensor and an additional distance measuring sensor in response to the body parameter; and a state decision section for deciding a state of the subject by analyzing detection outputs of the active distance measuring sensor and the additional distance measuring sensor. Thus, the subject-state detecting apparatus can give leeway to the variable number of the measurement points in advance. Accordingly, under the condition in which the subject to be measured moves dynamically, it offers an advantage of being able to carry out the optimum measurement in terms of the measurement time and accuracy by measuring only the fewest possible number of the measuring points to obtain the body parameter. Furthermore, it offers an advantage of being able to implement the optimum measuring sequence by controlling the distance measuring sensor system in its entirety which includes not only the active distance measuring sensors but also the additional distance measuring sensor to obtain the body parameter in response to the environmental conditions.

BRIEF DESCRIPTION OF THE DRAWINGS

FIG. 2 is a schematic diagram showing a state of an active distance measuring sensor of the embodiment 1 applied to a vehicle;

FIGS. 3(a)–3(d) are, together, a schematic diagram illustrating a structure and usage condition of the active distance measuring sensor of the embodiment 1;

DETAILED DESCRIPTION OF THE PREFERRED EMBODIMENTS

The invention will now be described with reference to the accompanying drawings.

Embodiment 1

Figure 1:
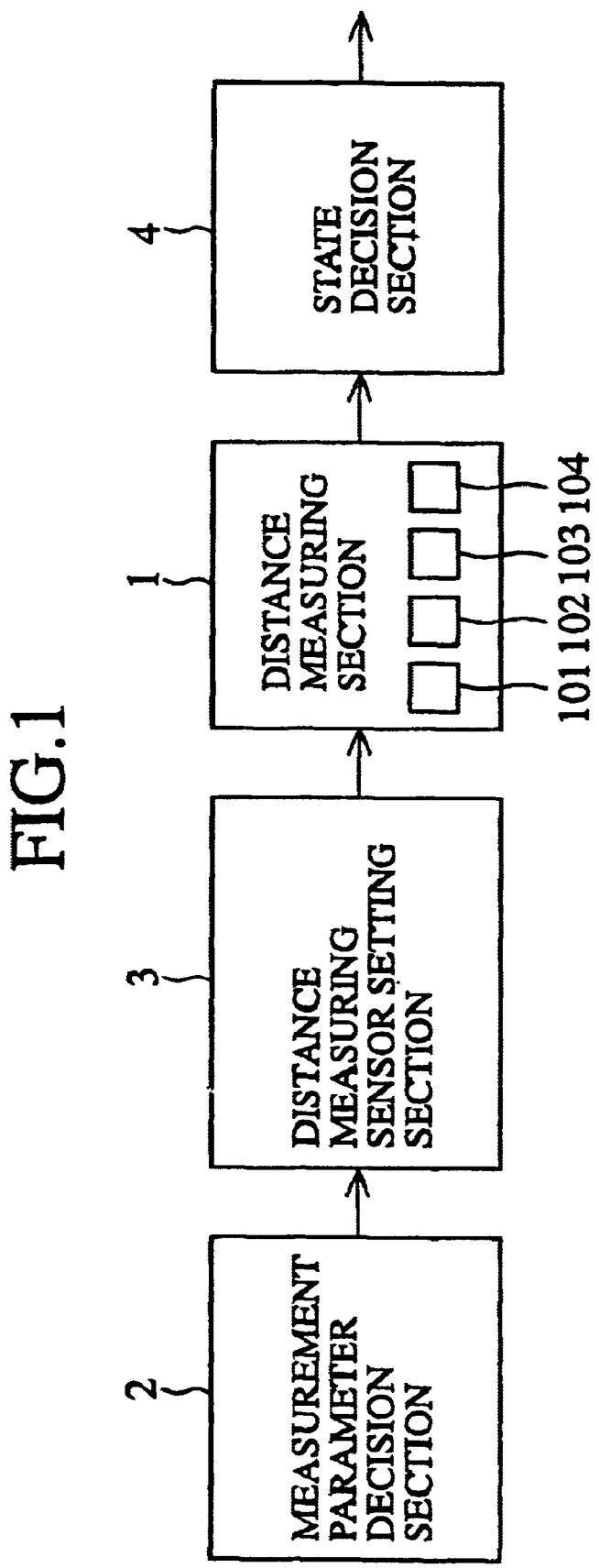
FIG. 1 is a block diagram showing a configuration of an embodiment 1 of the subject-state detecting apparatus in accordance with the present invention.

FIG. 1 is a block diagram showing a configuration of an embodiment 1 of the subject-state detecting apparatus in accordance with the present invention. In FIG. 1, the reference numeral 1 designates a distance measuring section. It comprises an active distance measuring sensor 101 (FIG. 3) including a plurality of projectors 110 for projecting beams of light onto N spots independently, where N is a positive integer, and a photodetector 116 for detecting reflection light from a subject receiving the light from the projectors. It may further comprise other distance measuring sensors (102–104 of FIG. 5) each for throwing and receiving a single light beam as needed. The reference numeral 2 designates a measurement parameter decision section for deciding a body parameter to be measured by the distance measuring section 1 in advance. The reference numeral 3 designates a distance measuring sensor setting section for setting a measurement region (the projector to be operated among the plurality of projectors) of the active distance measuring sensor in response to the body parameter to be measured the measurement parameter decision section 2 makes a decision of, and for setting which one of the distance measuring sensors is to be used when there are multiple sensors. The reference numeral 4 designates a state decision section for analyzing the detection outputs about the measurement regions of the active distance measuring sensor and other distance measuring sensors that are set, and for making a decision of the state of the subject in accordance with predetermined criteria of judgement.

FIG. 2 is a schematic diagram showing a state of the active distance measuring sensor 101 of the embodiment 1 applied to a vehicle. In FIG. 2, the reference numeral 50 designates a vehicle, 51 designates a seat, 61 designates an air bag mounted on the dashboard or wheel section, 62 designates a pressure-sensitive sheet sensor mounted at the bottom of the seat 51, 63 designates a weight sensor mounted on a seat support structure, and 80 designates the body of an occupant. The reference numeral 64 designates an ECU (Electronic Control Unit) mounted in the engine compartment of the vehicle 50 for controlling the air bag 61 in connection with an acceleration sensor (not shown) and various other sensors. The reference numeral 101 designates the active distance measuring sensor that comprises the plurality of projectors 110 and the photodetector 116 (FIG. 3(a)), and is mounted on the ceiling of the vehicle 50. The projectors can independently control projecting beams of light onto N spots of the body 80 sitting on the seat 51, where N is a positive integer. The photodetector 116 receives the reflection light from the subject (body), and detects the distances between the sensor and the measurement regions.

The active distance measuring sensor 101 has a structure that can selectively throw the beams of light onto the measurement points of the body 80, and detects the reflection as shown in the structural example of FIG. 3(a). In FIG. 3(a), the reference numeral 110 designates an LD module (a plurality of projectors) consisting of a plurality of LDs (laser diodes), 115 designates a polygonal mirror, and 116 designates the photodetector. The LD module 110 includes a combination of a surface emitting laser 111 and a microlens array 112 as shown in FIG. 3(b). Alternatively, it can include a combination of a plurality of LEDs 113 and collimator lenses 114 as shown in FIG. 3(c).

Here, the active distance measuring sensor 101 is configured such that the polygonal mirror 115 revolves the beams of light from the LD module 110 downward in the direction of the arrow so that the light beams scan the body 80 from top to bottom, and that the photodetector 116 mounted on the side of the polygonal mirror 115 receives the reflection light from the body 80. With such a configuration, the active distance measuring sensor 101 has an advantage of being able to establish optimum relationship between the resolution in the scanning direction and the time required for the measurement by varying the scanning speed. Incidentally, the polygonal mirror 115 can be replaced by a vibration mirror with a structure as shown in FIG. 3(d).

Next, the operation of the present embodiment 1 will be described.

When the subject-state detecting apparatus starts driving, the measurement parameter decision section 2 starts its operation, and decides the body parameters to be measured in accordance with the state of the vehicle, conditions in the vehicle, and the states of the body and sensors. For example, immediately after the start when the vehicle is moving slowly, the measurement parameter decision section 2 makes a decision that it can take sufficient time for the measurement. Thus, it decides to measure the static body parameters (frame) of the body 80 such as a shoulder width and sitting height. On the other hand, when the vehicle speed is 60 km/h and the frame is already known, for example, it makes a decision that the posture of the upper part of the body is to be measured. Furthermore, when events such as "seat belt is unfastened", "posture changes sharply" and "seat belt is fastened" occur while the active distance measuring sensor 101 is measuring the upper part of the body, it makes a decision that the frame is to be measured again because it is very likely that an occupant exchange has occurred in this case.

Subsequently, the distance measuring sensor setting section 3 decides the distance measuring sensors for measuring the body parameters decided by the measurement parameter decision section 2, thereby setting the distance measuring sensors to be used for the measurement besides the active distance measuring sensor 101. For example, when a decision is made to measure the shoulder width and sitting height, the distance measuring sensor setting section 3 sets one or more distance measuring sensors so that they are driven to throw beams of light onto the right and left upper arms and shoulders and to detect the reflection light. Alternatively, when a decision is made to measure the posture of the upper part of the body, it sets the distance measuring sensor so that it is driven to throw a beam of light onto the chest and its surroundings, which are particularly important to measure the posture, and to detect the reflection light. To set the measurement regions of the active distance measuring sensor 101, a decision is made which projectors among the plurality of projectors 110 are to be driven at which timing.

Figure 4:
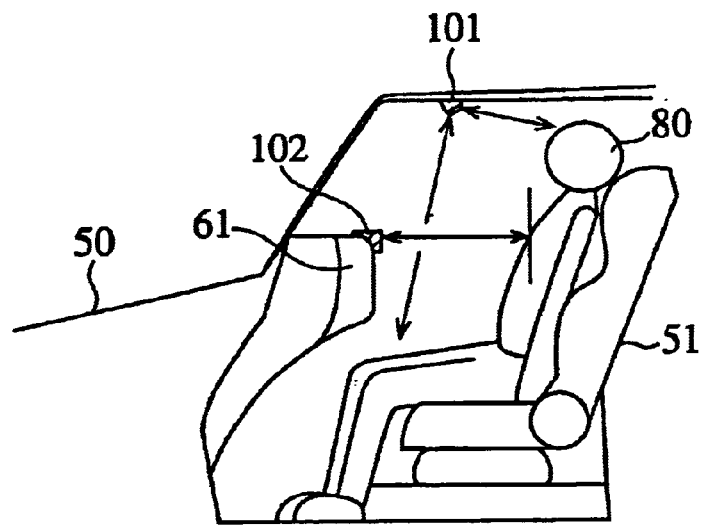
FIG. 4 is a schematic diagram showing a state using a plurality of distance measuring sensors in the embodiment 1.

FIG. 4 is a schematic diagram showing a state using a plurality of distance measuring sensors in the embodiment 1.

In FIG. 4, the reference numeral 102 designates a distance measuring sensor mounted on the dashboard. When the measurement parameter decision section 2 makes a decision to measure the posture of the upper part of the body 80, the distance measuring sensor setting section 3 sets and drives the distance measuring sensor 102 in front of the body so that it throws the beam of light toward the chest, and detects the reflection light. In the other cases, the body parameters are measured using the active distance measuring sensor 101 mounted on the ceiling. With the configuration as described above, it is possible to improve the measurement accuracy. This is because when the posture of the upper part of the body is measured, the distance measuring sensor 102 measures the posture from the optimum direction at a high rate. In addition, when the sitting height or shoulder width is measured, the active distance measuring sensor 101 measures obliquely from the upper side, thereby obtaining high density data.

Figure 5:
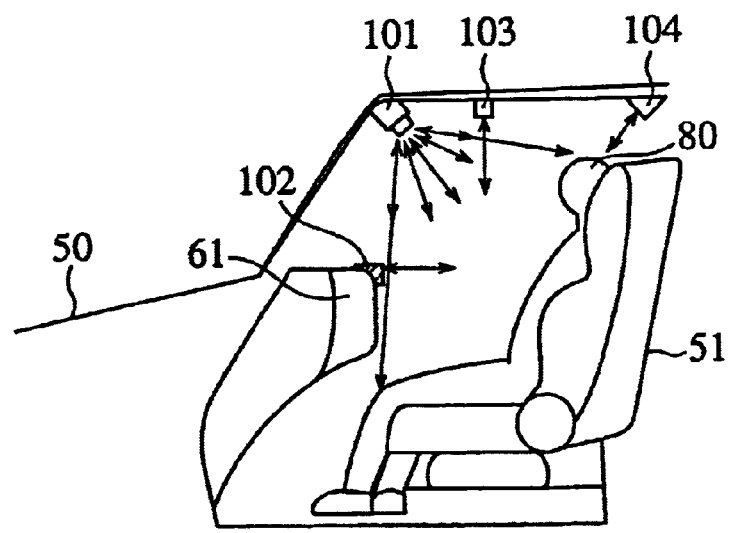
FIG. 5 is a schematic diagram showing another state using a plurality of distance measuring sensors in the embodiment 1.

FIG. 5 is a schematic diagram showing another state using a plurality of distance measuring sensors. In FIG. 5, reference numerals 103 and 104 each designates a distance measuring sensor mounted at positions on the ceiling different from that of the active distance measuring sensor 101. In this example, the distance measuring sensors 101–104 are placed at a plurality of locations, and are each adjusted to detect a particular state of the body 80. As described before, the distance measuring sensor 102 in front of the body 80 is adjusted to measure the posture of the upper part of the body. The distance measuring sensor 103 directly above is adjusted to discriminate between a thigh thickness at sitting position and a child restraint. The distance measuring sensor 104 located in a rearward position of the head is adjusted to detect the sitting height or the presence or absence of a person. Measurement by the distance measuring sensors 101–104 thus disposed can positively detect the state of the person.

Using the active distance measuring sensor 101 and the distance measuring sensors 102, 103 and 104, which are set by the distance measuring sensor setting section 3, the distance measuring section 1 throws beams of light onto the measurement points of the body 80, and produces the detection outputs from the reflection light thereof. The state decision section 4 analyzes the detection output data to make a decision of the state of the subject with reference to the prescribed criteria of judgement. The decision result data the state decision section 4 outputs are transferred to post-stages to be used.

Other examples of the active distance measuring sensor 101 will now be described with reference to FIGS. 6 and 7, although one example has been described in reference to FIG. 3.

Figure 6:
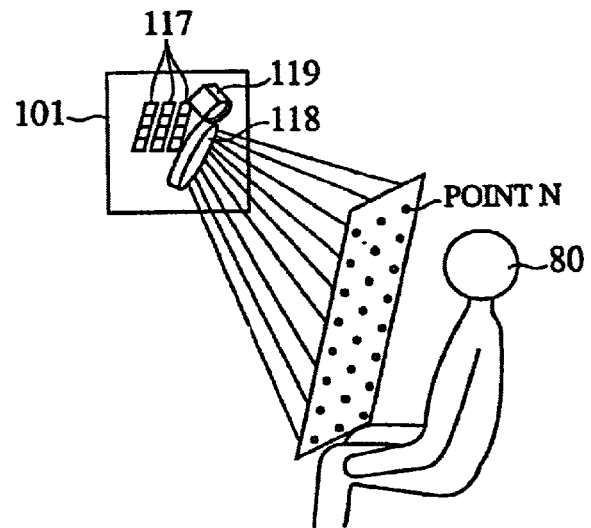
FIG. 6 is a schematic diagram illustrating another example of the active distance measuring sensor of the embodiment 1.

In FIG. 6, the reference numeral 117 designates a surface emitting laser with N(=8×3, for example) elements functioning as projectors; 118 designates a lens system for collimating the laser beams from the surface emitting laser 117, and for spreading them out in both the vertical and horizontal directions; and 119 designates a photodetector placed next to the lens system 118 for receiving the reflection light from the body 80. With the foregoing configuration, the active distance measuring sensor 101 can control the beams independently. In addition, since it includes no mechanical driving section such as the polygonal mirror 115, it can increase the reliability of the sensor.

Figure 7:
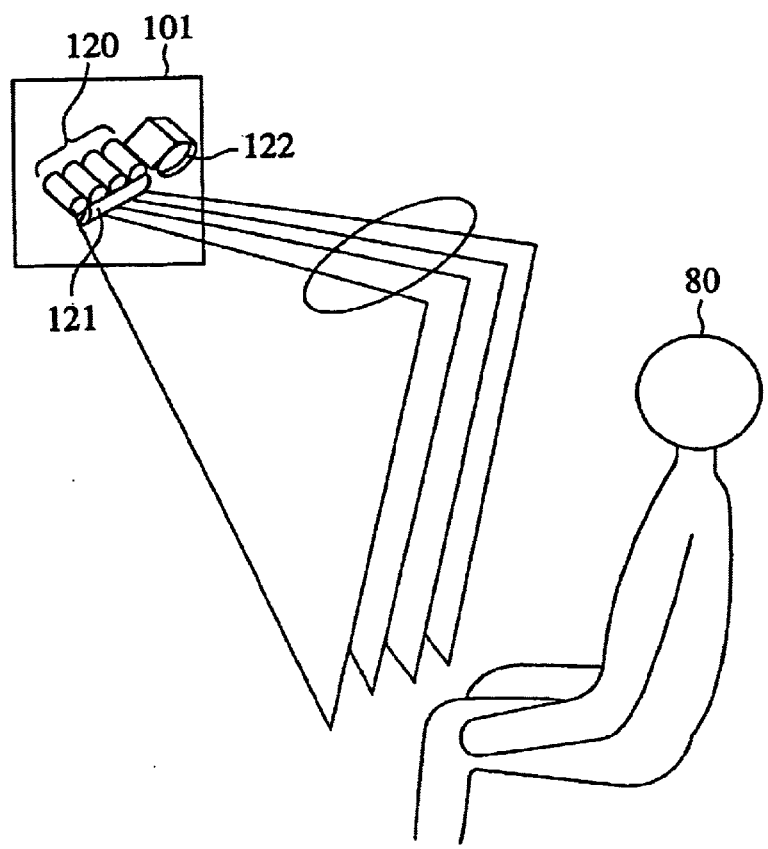
FIG. 7 is a schematic diagram illustrating still another example of the active distance measuring sensor of the embodiment 1.

In FIG. 7, the reference numeral 120 designates an LD module consisting of a plurality of LDs disposed in a line; 121 designates a semicircular cylinder lens for spreading the laser beams from the LD module 120 into sheet-like beams; and 122 designates a photodetector disposed next to the LD module 120. The configuration implements the LD module using a small number of LDs, and enables high-density three-dimensional measurement. It is necessary for the sheet-like light beams to be set in an optimum direction for measuring the body parameters regardless of the vertical or horizontal direction. The LD module 120 can be replaced by a surface emitting laser.

Figure 8:
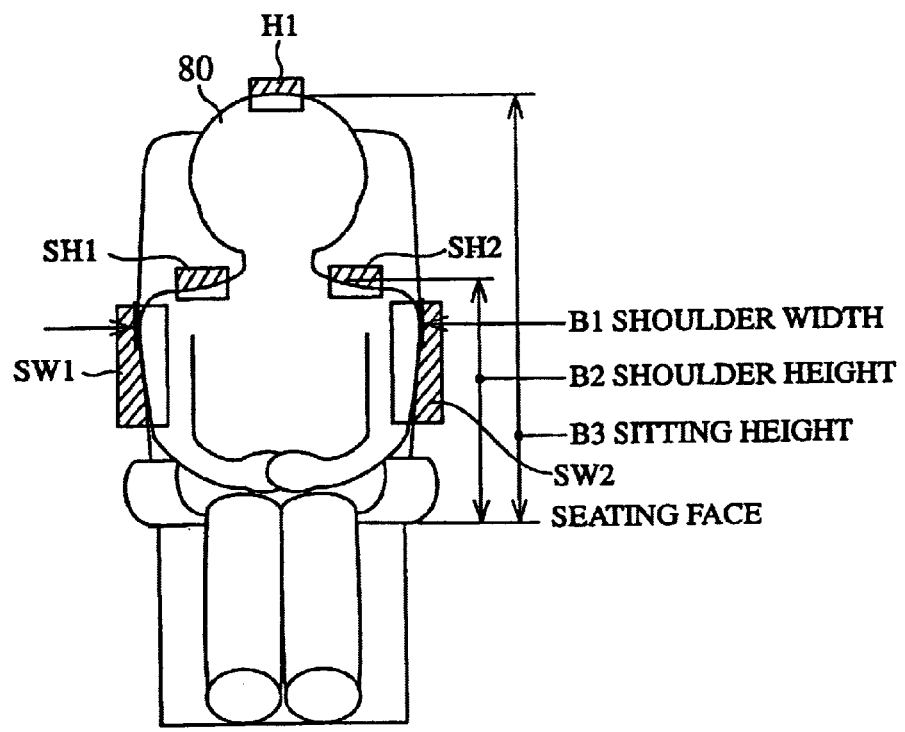
FIG. 8 is a diagram illustrating an example of the measurement parameter decision scheme in the embodiment 1.
Figure 9:
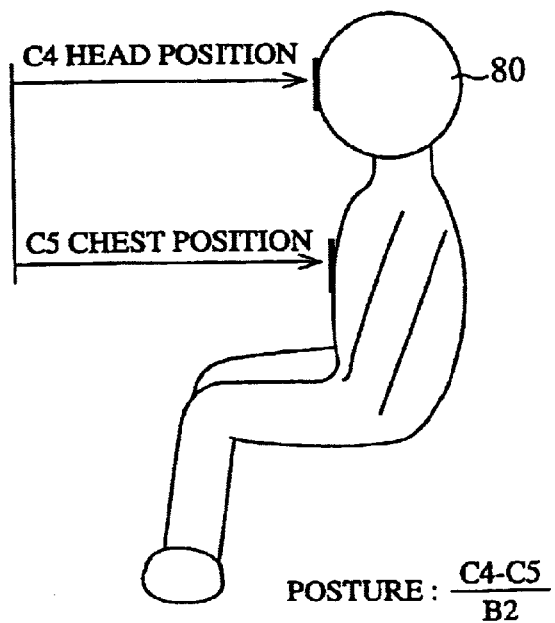
FIG. 9 is a diagram illustrating another example of the measurement parameter decision scheme in the embodiment 1.

FIGS. 8 and 9 are schematic diagrams illustrating other example of deciding the measurement parameters. Here, the distance measuring sensor setting section 3 defines the body parameters such as the sitting height B3, shoulder width B1 and shoulder height B2 of the body 80 to be measured by the distance measuring sensors. In addition, rectangles H1, SH1, SH2, SW1 and SW2 including shaded portions represent regions (measurement points) constituting the centers of attention when measuring the body parameters. For example, to measure the shoulder width as one of the body parameters, the distance measuring sensor setting section 3 arranges to drive the distance measuring sensors for mainly measuring the target regions SH1 and SH2. Incidentally, the body parameters and their distance measuring method can be defined in other ways. FIG. 9 defines the posture of the body 80 as a target state of the distance measurement. Here, the posture is defined by a value (C4–C5)/B2, where C4 is the head position, C5 is the chest position and B2 is the shoulder height as shown in FIG. 8.

Figure 10:
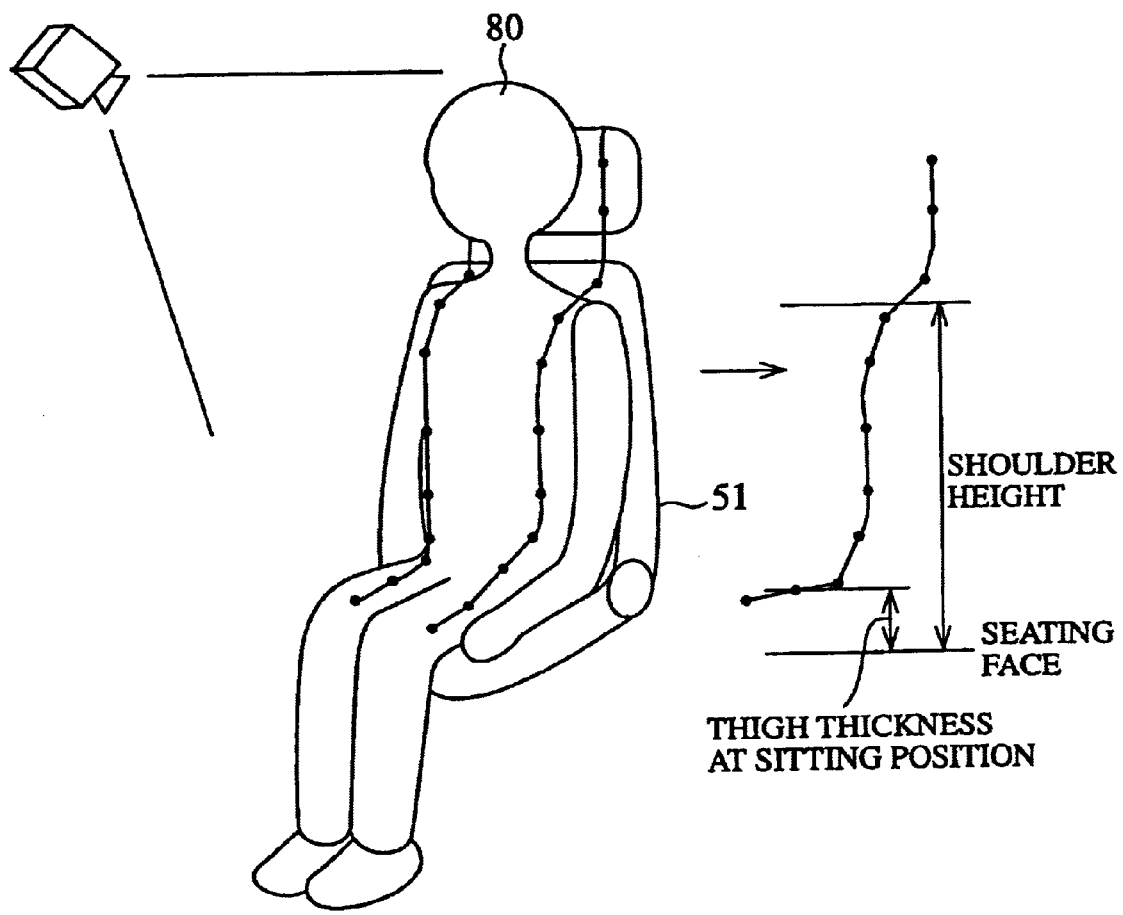
FIG. 10 is a schematic diagram illustrating an operation of the state decision section of the embodiment 1.

FIG. 10 is a schematic diagram illustrating an operation of the state decision section 4. In FIG. 10, the multipoint distance measurement from the shoulder to the thigh of the occupant (body) 80 can be made in the vertical direction as follows. First, the shoulder height is obtained as a distance from the upper inflection point to the seating face in the distance distribution of the measured points as shown in the right-hand side of FIG. 10. In addition, the thigh thickness at sitting position is obtained as the height from the lower inflection point to the seating face. Since the measurements inevitably include an error, the inflection points cannot be always detected because of the effect of the error. In such a case, the problem can be circumvented by increasing the number of measurement points along the time axis to reduce the measurement error by using a time direction measurement section 6 which will be described later, for example, or by searching for the inflection points from a broader view.

The state decision section 4 decides the occupant state from the distance distribution thus obtained. In the course of this, it calculates the body parameters associated with the frame or the upper part of the body, which are decided as necessary, and makes a final decision on the basis of the prescribed criteria of judgement. For example, when the distance distributions near the both upper arms are obtained, the front side of the median values of the distance distributions are decided as the body and the rear side thereof as the background, and the shoulder width is calculated by multiplying the distance between the boundaries of the body and background by a predetermined correcting value, or by adding a correction value to the distance. The sitting height can be decided in an analogous way.

Generally speaking, although a growing number of measurement points will increase the accuracy and robustness of the measurement, it will increase the time needed for the measurement. In the present apparatus, the number of the measurement points is made variable and has a certain margin. Thus, when the subject moves dynamically, only the fewest possible measurement points are measured to quickly obtain the body parameters required, thereby carrying out the optimum measurement in terms of the measurement time and accuracy. In addition, the optimum measuring sequence is implemented by controlling the sensor system in its entirety, which includes not only the active distance measuring sensor 101, but also the additional distance measuring sensors 102–104 as shown in FIG. 5, to obtain the body parameters.

As described above, the present embodiment 1 is configured such that the distance measuring section 1 comprises the active distance measuring sensor including the projectors for targeting the measurement regions independently, and the photodetector for receiving the reflection light from the subject to which the beams of light are thrown; that the measurement parameter decision section 2 decides the body parameters to be measured at the present time; that the distance measuring sensor setting section 3 sets the measurement regions of the active distance measuring sensor together with the additional distance measuring sensors in response to the body parameters; and that the state decision section 4 analyzes the detection output data supplied from the sensors which are set, thereby making a decision of the state of the subject. Accordingly, the present embodiment 1 can give leeway to the number of the measurement points in advance. Thus, it offers an advantage of being able to carry out the optimum measurement in terms of the measurement time and accuracy by measuring only the fewest possible number of the measuring points to obtain the body parameters under the condition in which the subject to be measured moves dynamically. Furthermore, it offers an advantage of being able to implement the optimum measuring sequence by controlling the distance measuring sensor system in its entirety which includes not only the active distance measuring sensor, but also the additional distance measuring sensors to obtain the body parameters in response to the environmental conditions.

Embodiment 2

Figure 11:
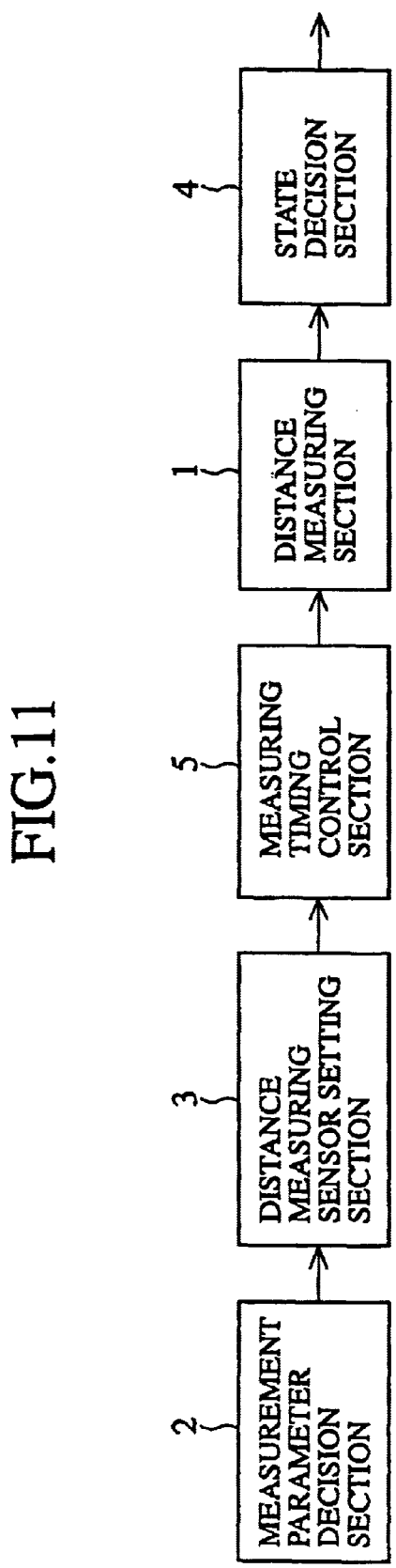
FIG. 11 is a block diagram showing a configuration of an embodiment 2 of the subject-state detecting apparatus in accordance with the present invention.

FIG. 11 is a block diagram showing a configuration of an embodiment 2 of the subject-state detecting apparatus in accordance with the present invention. It comprises a measuring timing control section 5 between the distance measuring sensor setting section 3 and the distance measuring section 1 as shown in FIG. 1.

The measuring timing control section 5 generates a timing control signal in response to the setting result of the distance measuring sensors, which is established by the distance measuring sensor setting section 3, and controls the distance measuring section 1 such that the distance measuring sensors throw the beams of light in response to the timing control signal. Considering the safety of a person actually measured, it is not always possible for the distance measuring sensors to throw the beams of light all at once. To cope with such a situation, the measuring timing control section 5 generates the timing signal in response to the setting result of the distance measuring sensors the distance measuring sensor setting section 3 sets up, and supplies the timing signal to the distance measuring section 1. In response to the timing signal, the distance measuring section 1 activates the active distance measuring sensor and the additional distance measuring sensors so that they illuminate the measuring regions. Thus, the active distance measuring sensor controls the driving sequence of the projectors in response to the timing control signal. In addition, the measuring timing control section 5 can control the intervals of illumination and its intensity, thereby making it possible to detect the locations of the throwing points of the light beams positively even if external disturbances such as ambient light are present. Receiving the timing control signal from the measuring timing control section 5, the distance measuring section 1 carries out actual measurement using the active distance measuring sensor 101, and other pressure-sensitive sheet sensor 62 and weight sensor 63 as shown in FIG. 2, if they are mounted.

Figure 12:
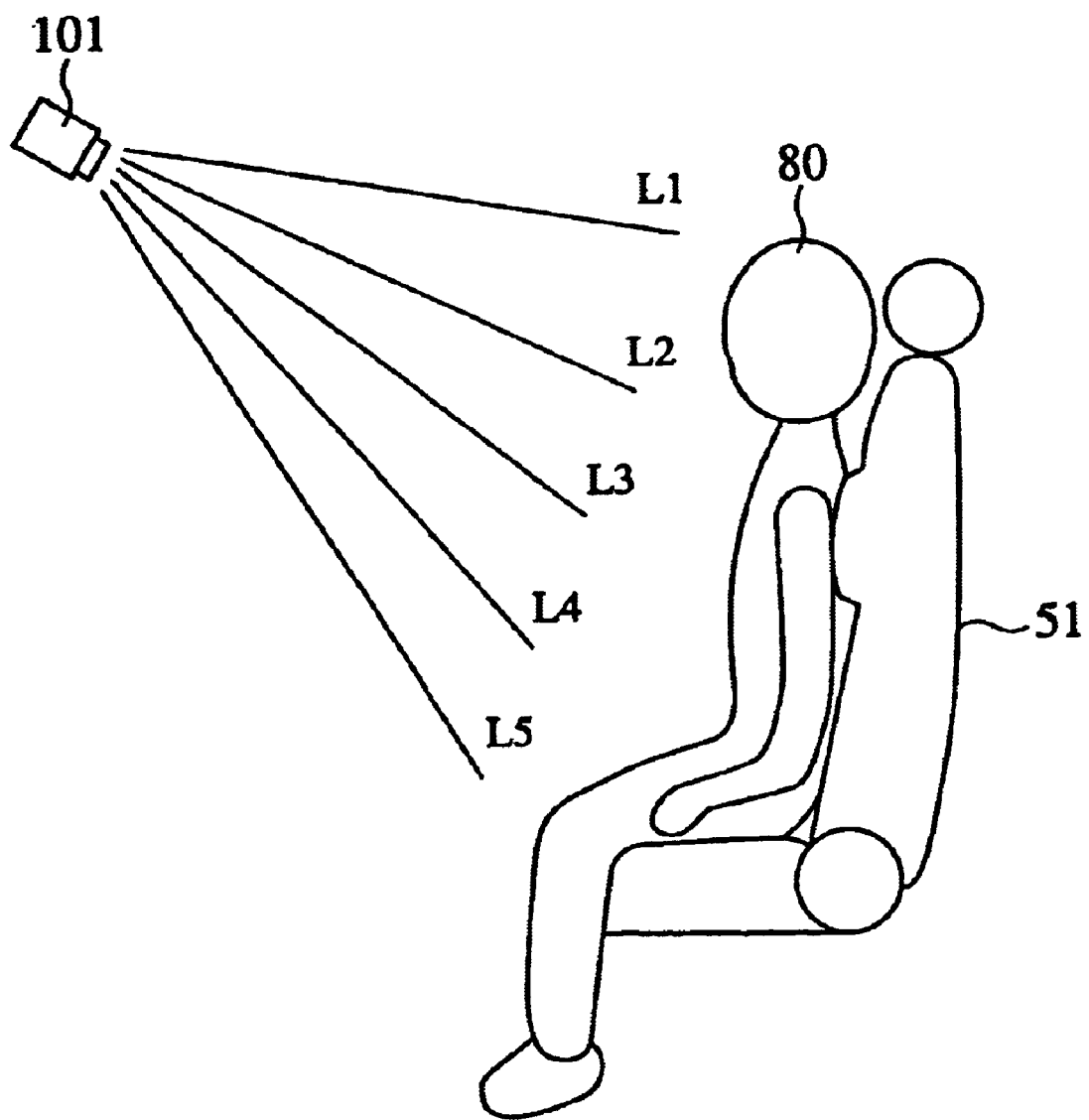
FIG. 12 is a schematic diagram illustrating an operation mode of a measuring timing control section of the embodiment 2.

FIG. 12 is a schematic diagram illustrating an operation mode of the measuring timing control section 5. For example, to observe the occupant (body) 80 downward using multiple beams, the measurement is performed by sequentially throwing the beams beginning from the uppermost beam to lower beams such as L1, L2, . . . at certain intervals. Thus, the present embodiment 2 can secure the safety by preventing the plurality of beams from entering the eyes of the occupant. In addition, since the upper part of the body has a tendency to move greater as it is closer to the head in the sitting position, measuring from the uppermost to the lower level enables the stable measurement with reducing the effect of the movement of the upper part of the body.

As described above, the embodiment 2 is configured such that when the distance measuring section 1 employs the sensors using such as a laser beam that has adverse effect on the eye of the body, and hence multiple beams cannot be thrown simultaneously on the body 80, the measuring timing control section 5 shifts the throwing timing along the time direction. As a result, the present embodiment 2 offers an advantage of being able to secure the safety of the body (especially of the eye).

Embodiment 3

Figure 13:
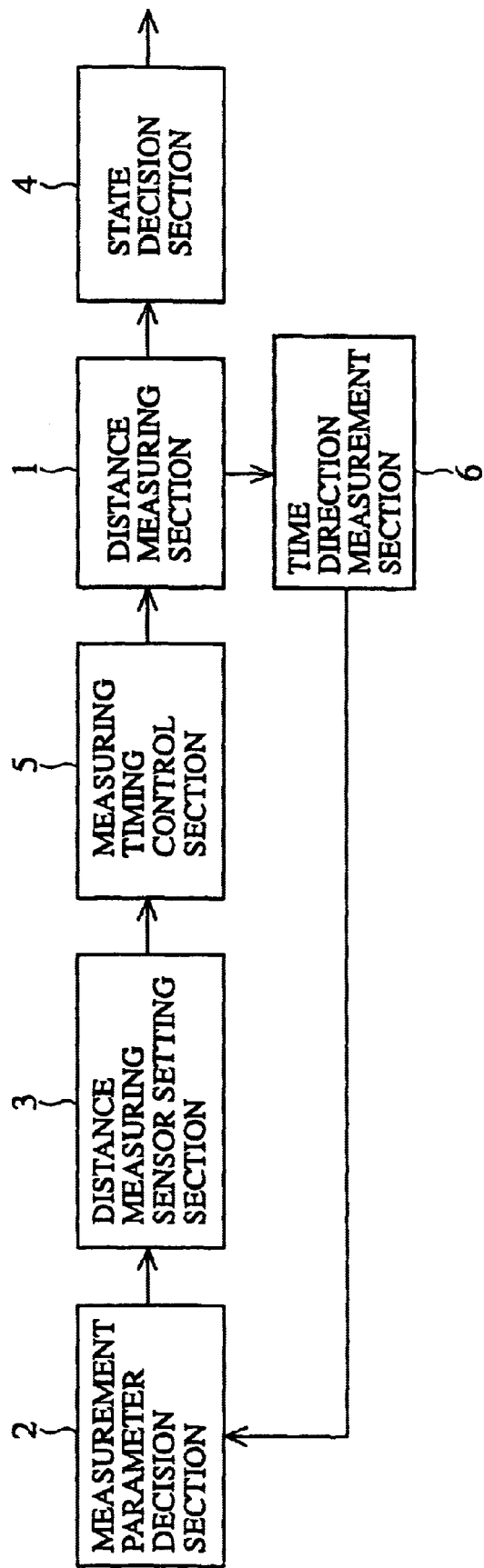
FIG. 13 is a block diagram showing a configuration of an embodiment 3 of the subject-state detecting apparatus in accordance with the present invention.

FIG. 13 is a block diagram showing a configuration of an embodiment 3 of the subject-state detecting apparatus in accordance with the present invention. It includes a time direction measurement section 6 in addition to the configuration as shown in FIG. 11.

The time direction measurement section 6 triggers the measurement parameter decision section 2 so that the distance measuring section 1 repeats the same measurement operation as it completes once as described in the embodiment 1 or 2. The time series measurement data obtained as a result of the repetitive measurements are stored into the state decision section 4. The state decision section 4 carries out smoothing and deviation value processing of the measurement data to improve the accuracy of the measurement and of the frame discrimination. In this case, the number of times of the measurement is determined by the time direction measurement section 6 in advance. In addition, since the passenger on the right side of the driver rarely exchanges during traveling within the vehicle, it is easy to carry out multiple times of measurements of the same subject with shifting the measuring timing.

As described above, the present embodiment 3 is configured such that it comprises the time direction measurement section 6 to carry out the distance measurement a plurality of times. Thus, it can decide the state of the subject accurately from the time series measurement results, thereby offering an advantage of being able to obtain highly reliable decision result.

Embodiment 4

Figure 14:
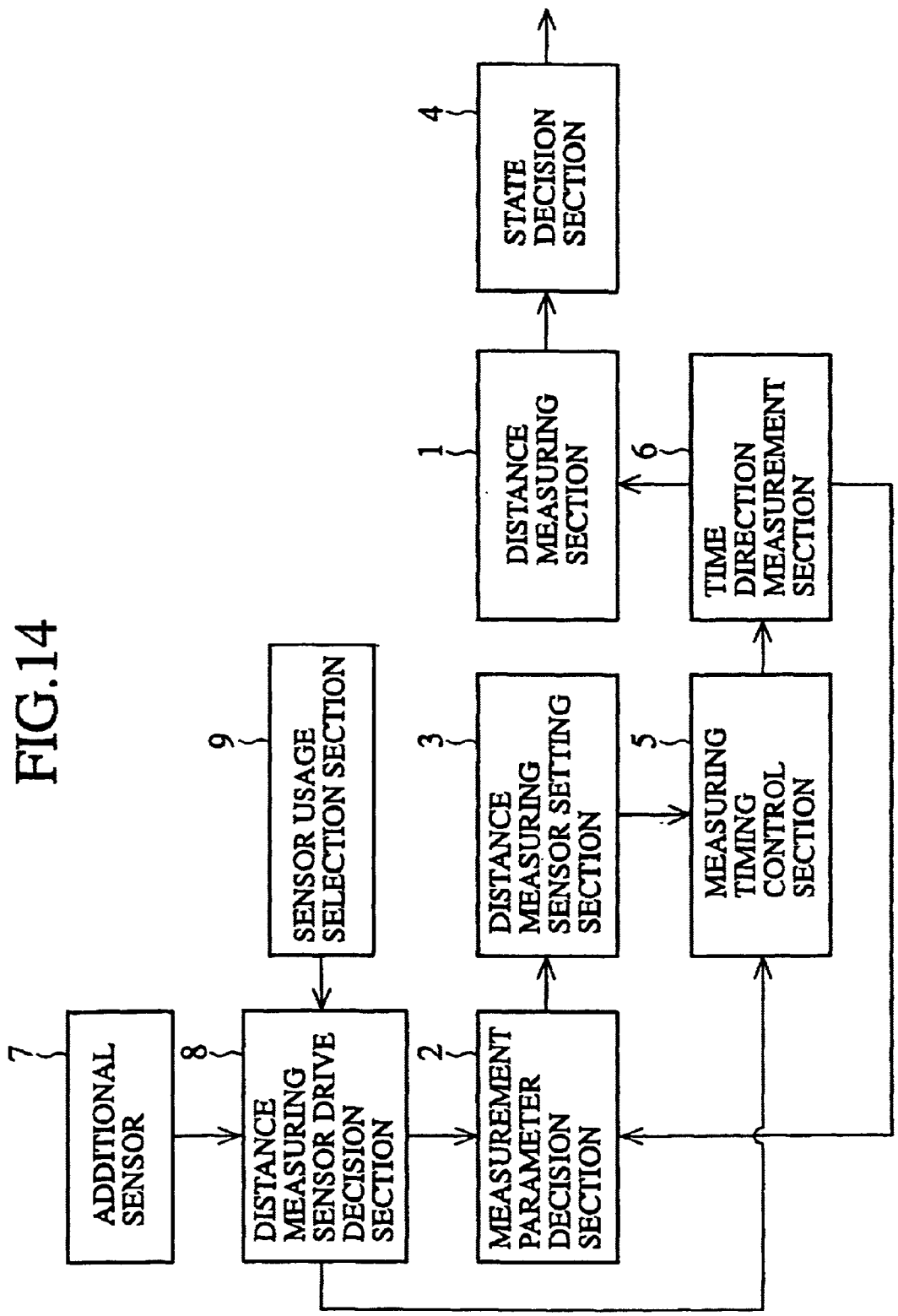
FIG. 14 is a block diagram showing a configuration of an embodiment 4 of the subject-state detecting apparatus in accordance with the present invention.

FIG. 14 is a block diagram showing a configuration of an embodiment 4 of the subject-state detecting apparatus in accordance with the present invention. It comprises an additional sensor 7, a distance measuring sensor drive decision section 8, and a sensor usage selection section 9.

The additional sensor 7 refers to a sensor such as a vehicle speed sensor or a steering detection sensor other than the above-mentioned distance measuring sensors and the like. The distance measuring sensor drive decision section 8, receiving the detection outputs from the additional sensor 7, makes a decision whether to drive the subject-state detecting apparatus or not, and activates the measurement parameter decision section 2 to start the operation. The sensor usage selection section 9 enables or disables the distance measuring sensor drive decision section 8 in response to the control of the occupant to drive or halt the subject-state detecting apparatus. However, it is also applicable to control the operation of the sections other than the distance measuring sensor drive decision section 8.

Figure 15:
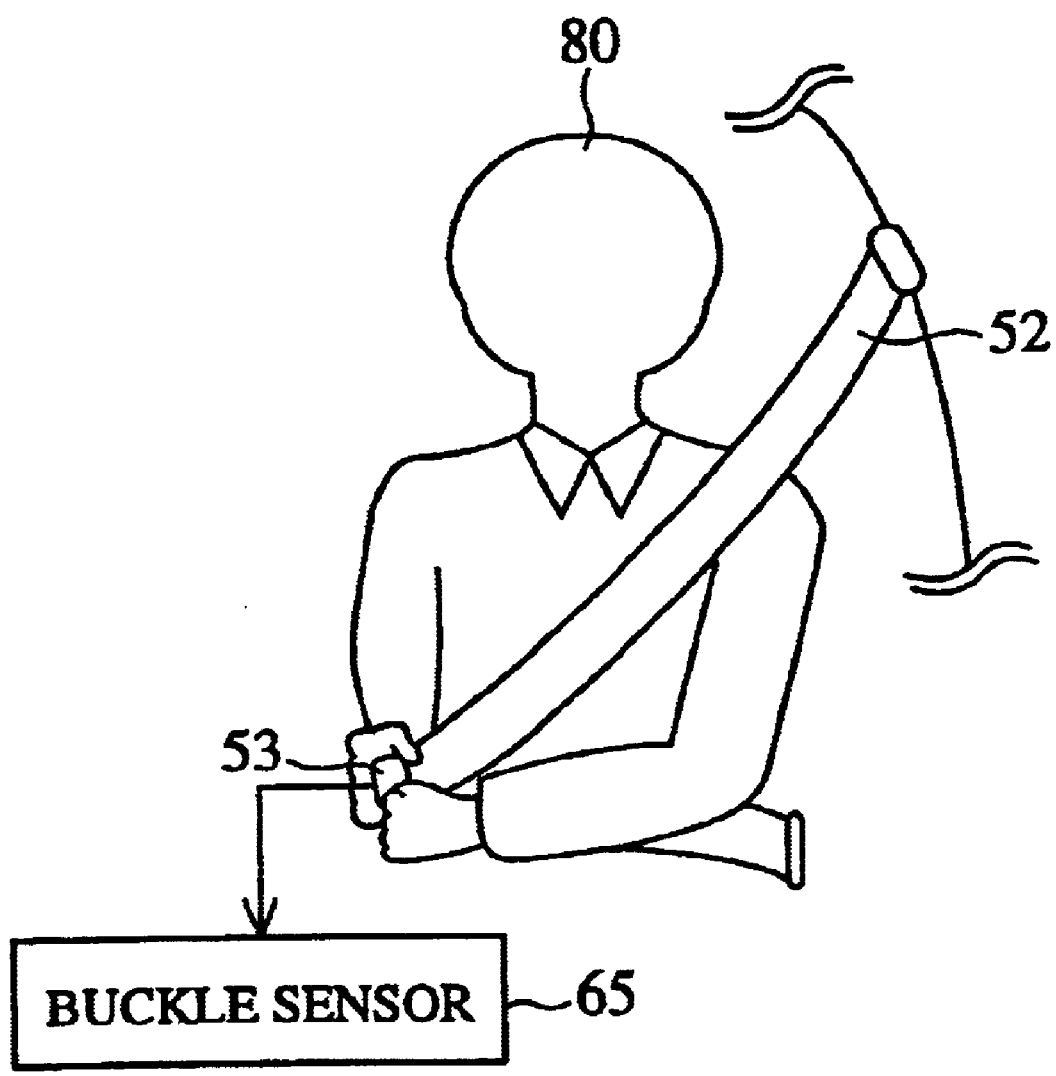
FIG. 15 is a schematic diagram illustrating an operation of the active distance measuring sensor drive decision section of the embodiment 4.

FIG. 15 is a schematic diagram illustrating an operation of the distance measuring sensor drive decision section 8. In FIG. 15, the reference numeral 52 designates a seat belt, 53 designates a buckle for fastening the seat belt 52, and 65 designates a buckle sensor for detecting that the seat belt is fastened to the buckle 53. When the additional sensor 7 is the buckle sensor 65, it supplies the detection output to the distance measuring sensor drive decision section 8 when the seat belt 52 is fastened. In response to it, the distance measuring sensor drive decision section 8 controls the measurement parameter decision section 2 such that it starts the distance measurement. In the example, the posture of the occupant is rather fixed by the seat belt 52. Accordingly, the example is suitable for measuring the body parameters such as the occupant's frame at high reliability.

In another example in which the additional sensor 7 is the vehicle speed sensor, the distance measuring sensor drive decision section 8 commands the measuring timing control section 5 to set measurement timing in response to the output of the vehicle speed sensor. At the low vehicle speed, the measuring timing control section 5 generates the timing signal to carry out the distance measuring at high density for a long time, thereby obtaining a highly accurate measurement result. In contrast, at the high vehicle speed, the measuring timing control section 5 generates the timing signal for high-speed measurement, thereby preparing for an unexpected collision.

Unless the state decision section 4 has the recognition rate of 100%, it is unavoidable that a case occurs where the subject-state detection apparatus cannot recognize the state by any means depending on the subject and its state and environment. In such a case, the occupant makes a decision as to whether to use the subject-state detecting apparatus, and halts its operation by manipulating the sensor usage selection section 9 to circumvent the worst case.

As described above, the present embodiment 4 is configured such that the distance measuring sensor drive decision section 8 decides the start timing of the distance measuring sensors in response to the state of the additional sensor 7. Thus, the present embodiment 4 can start the subject state decision operation automatically. When the buckle sensor 65 of the seat belt 52 is used as the additional sensor 7, it offers an advantage of being able to achieve highly reliable measurement from the state immediately after the subject is fastened. On the other hand, when the vehicle speed sensor is used as the additional sensor 7, the distance measuring sensor drive decision section 8 can command the measuring timing control section 5 to set the measurement timing in response to the detection result of the vehicle speed sensor. Thus, it offers an advantage of being able to perform measurement in accordance with the purpose associated with the vehicle speed. In addition, the sensor usage selection section 9 makes it possible for the user to specify whether to use the subject-state detecting apparatus or not. Thus, it offers an advantage of being able to stop the operation of the apparatus when an unfavorable state occurs such as a low recognition rate.

Embodiment 5

Figure 16:
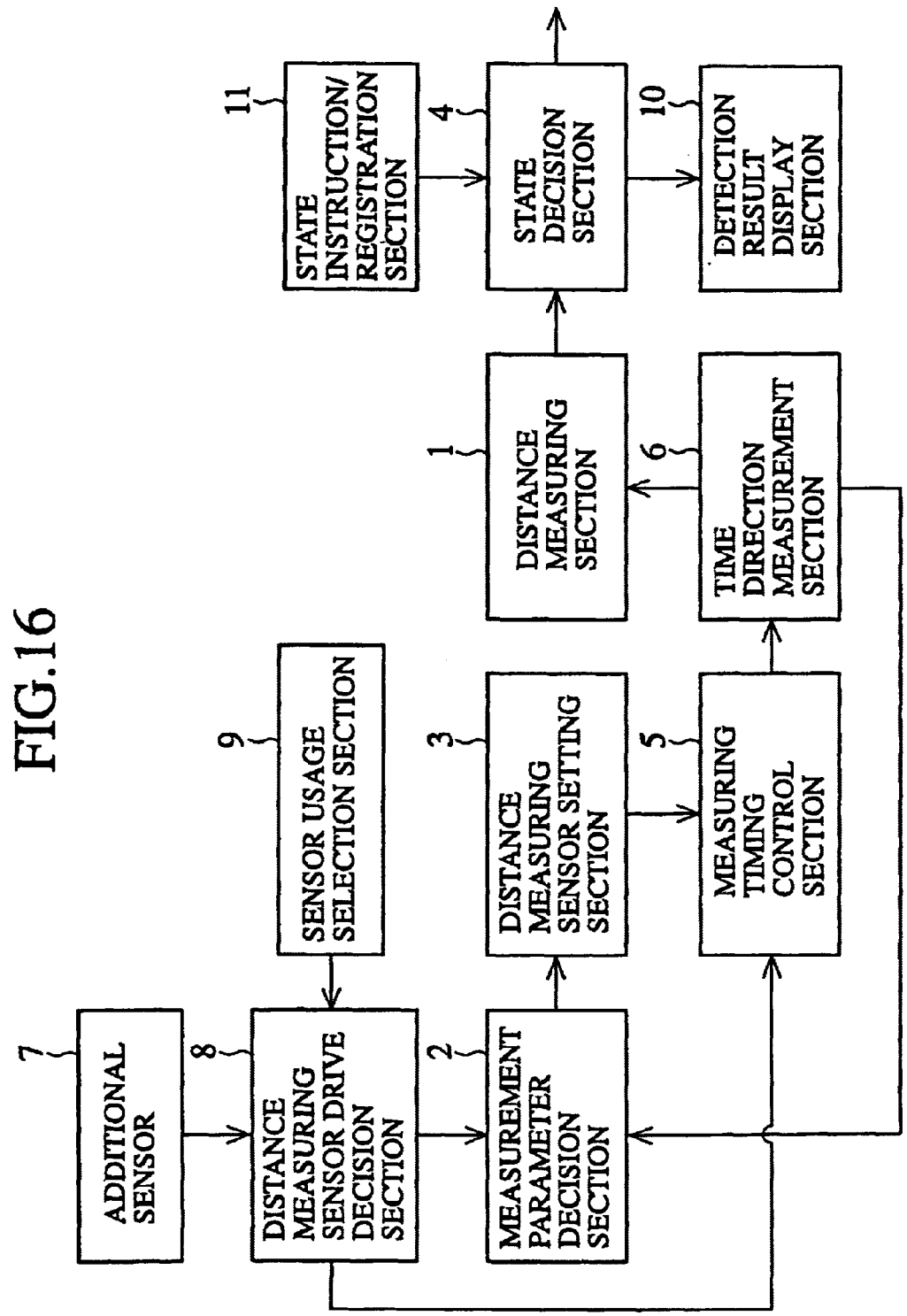
FIG. 16 is a block diagram showing a configuration of an embodiment 5 of the subject-state detecting apparatus in accordance with the present invention.

FIG. 16 is a block diagram showing a configuration of an embodiment 5 of the subject-state detecting apparatus in accordance with the present invention. It comprises a detection result display section 10 and a state instruction/registration section 11 in addition to the configuration of FIG. 14.

The detection result display section 10 displays the decision result of the state decision section 4. In this case, the state decision section 4 includes evaluation criteria for evaluating the decision result, and obtains the evaluation result of the decision result with reference to the evaluation criteria. Then, it causes the detection result display section 10 to display the evaluation result in terms of comments and display drawings together with the ordinary decision result. For example, when the state decision section 4 evaluates that the occupant is a small woman from the decision result of the body parameters such as the sitting height and shoulder width, the detection result display section 10 displays the resultant information to let her know it. As another example, when the state decision section 4 evaluates from the posture of the upper part of the body of the occupant that the head position is too close to the air bag, the detection result display section 10 displays an alarm to inform the occupant that the air bag will not inflate at the collision if this state remains.

Figure 17:
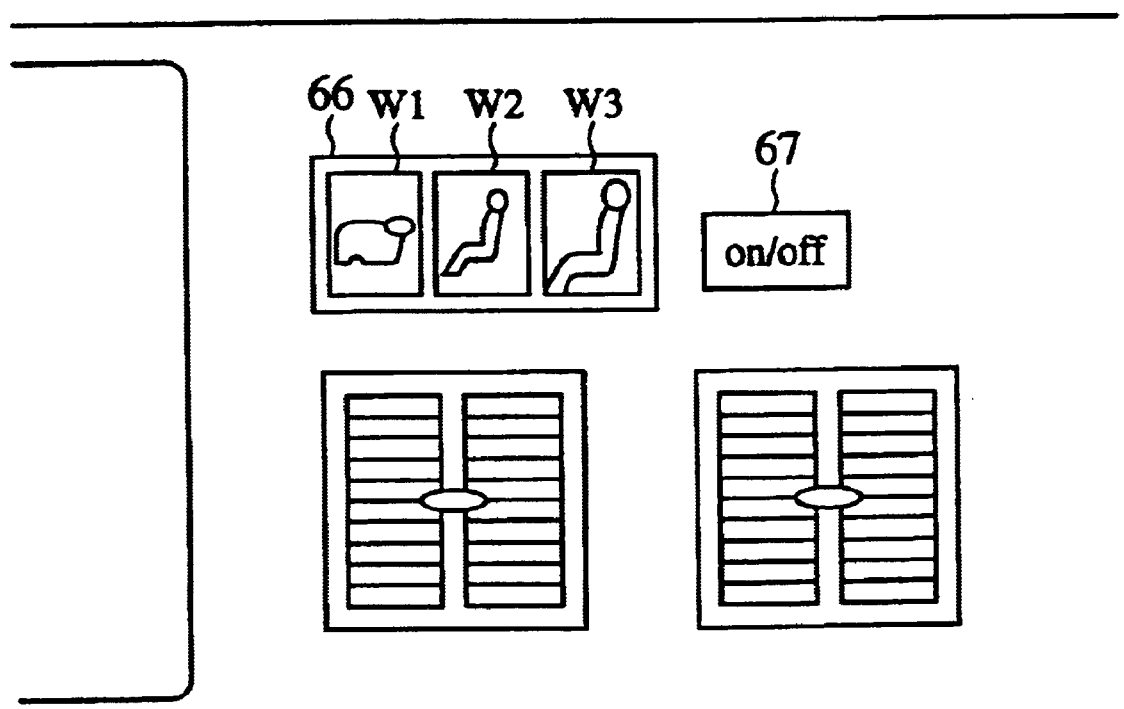
FIG. 17 is a schematic diagram illustrating an example of the display by the detection result display section of the embodiment 5.

FIG. 17 is a schematic diagram illustrating a display example by the detection result display section 10. In FIG. 17, the reference numeral 66 designates a display unit mounted in the dashboard. The reference numeral 67 designates a control switch connected to the sensor usage selection section 9 for the user to decide whether to drive the apparatus or not.

The display unit 66 displays the decision result of the state decision section 4 about the occupant in windows W1, W2 and W3. The windows indicate the categories into which the decision result about the occupant is divided by the present apparatus.

The state instruction/registration section 11 is provided for the user to update the criteria of judgement as needed which are used by the state decision section 4 to decide the state of the subject. This enables the user to instruct and register the occupant state that matches the real situation. For example, assume that the state decision section 4 makes an erroneous judgement as to a rear-facing vacant child restraint for an infant that the child is present in it. In such a case, the user checks the decision result on the detection result display section 10, and instructs and registers to the state decision section 4 through the state instruction/registration section 11 that only the child restraint is present currently. In this way, the state decision section 4 updates its own criteria of judgement so that it makes a correct judgement using the update data from the subsequent processing. Furthermore, the state instruction/registration section 11 can provide the learning effect that enables the decision in accordance with the actual situation by instructing and registering various states of the occupant as the criteria of judgement.

As described above, the present embodiment 5 is configured such that the detection result display section 10 displays the decision result by the state decision section 4. Thus, it offers an advantage of enabling the user to confirm the state, and to take the next action in response to the situation. In addition, the present embodiment 5 is configured such that it comprises the state instruction/registration section 11 for instructing and registering the correct state of the subject when the decision result includes some error, thereby updating the criteria of judgement of the state decision section 4. Thus, it offers an advantage of being able to obtain the decision result in accordance with actual situation, and to improve the measurement accuracy.

What is claimed is:

1. A subject-state detecting apparatus comprising:
  a distance measuring section that has an active distance measuring sensor including a plurality of light projectors controlled independently in targeting respective measurement regions, and a photodetector for detecting reflection light reflected from a subject that receives light projected by said plurality of light projectors;
  a measurement parameter decision section for selecting, body parameters measured by said distance measuring section based on states of the subject and surroundings of the subject;

a distance measuring sensor setting section for setting a measurement regions of said active distance measuring sensor, in response to the body parameters selected; and a state decision section for analyzing a detection output of said active distance measuring sensor from the measurement regions, and for determining a state of the subject with reference to prescribed judgment criteria.

2. The subject-state detecting apparatus according to claim 1, further comprising a measuring timing control section for generating a timing control signal in response to a setting of said active distance measuring sensor, obtained by said distance measuring sensor setting section, and for controlling said distance measuring section such that said active distance measuring sensor illuminates the subject in response to the timing control signal.

3. The subject-state detecting apparatus according to claim 1, further comprising a time direction measurement section for triggering said measurement parameter decision section such that said distance measuring section iterates a measuring operation already carried out once, a predetermined number of times in a time direction, wherein said state decision section stores time series measurement data captured in the measuring operation iterated, and carries out smoothing processing and deviation value processing of stored measurement data to obtain a decision result.

4. The subject-state detecting apparatus according to claim 2, wherein said subject-state detecting apparatus is mounted on a vehicle, and further comprising:

an additional sensor; and a distance measuring sensor drive decision section for making a decision as to whether said subject-state detecting apparatus is to be driven in response to a detection output of said additional sensor mounted on said vehicle, and for activating said measurement parameter decision section to start operation of said subject-state detecting apparatus.

5. The subject-state detecting apparatus according to claim 4, wherein, when said additional sensor is a vehicle speed sensor, said distance measuring sensor drive decision section commands said measuring timing control section to generate the timing control signal corresponding to a vehicle speed in response to a detection output of said vehicle speed sensor.

6. The subject-state detecting apparatus according to claim 1, further comprising a sensor usage selection section for a user to specify whether said subject-state detecting apparatus is to be driven.

7. The subject-state detecting apparatus according to claim 1, further comprising a detection result display section for displaying a decision result supplied from said state decision section, wherein said state decision section supplies said detection result display section with information including a comment and a display drawing said state decision section produces by evaluating the decision result with reference to predetermined evaluation criteria, with the information contained in the decision result.

8. The subject-state detecting apparatus according to claim 1, further comprising a state instruction/registration section for updating and registering the judgment criteria said state decision section uses for deciding the subject state in accordance with a need of a user.

9. The subject-state detecting apparatus according to claim 1, wherein said light projectors comprise a surface emitting laser for outputting a plurality of laser beams, and a lens system for collimating and spreading the laser beams, and wherein said photodetector is placed next to the lens system.

10. The subject-state detecting apparatus according to claim 1, wherein said light projectors comprise a laser diode (LD) module consisting of a plurality of LDs placed in a line, and a semicircular cylindrical lens for spreading light of the laser beams from said LD module, and wherein said photodetector is disposed next to the LD module.

11. The subject-state detecting apparatus according to claim 1, further comprising an additional distance measuring sensor, wherein said distance measuring sensor setting section sets said additional distance measuring sensor, and said state decision section analyzes a detection output of said additional distance measuring sensor to determine the state of the subject.

* * * * *